United States Patent
Lin et al.

(10) Patent No.: US 11,696,217 B2
(45) Date of Patent: *Jul. 4, 2023

(54) METHOD, NETWORK DEVICE AND TERMINAL DEVICE FOR REMAINING MINIMUM SYSTEM INFORMATION

(71) Applicant: Telefonaktiebolaget LM Ericsson (publ), Stockholm (SE)

(72) Inventors: Zhipeng Lin, Nanjing (CN); Pål Frenger, Linköping (SE); Asbjörn Grövlen, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

This patent is subject to a terminal disclaimer.

(21) Appl. No.: 17/186,010

(22) Filed: Feb. 26, 2021

(65) Prior Publication Data

US 2021/0185594 A1 Jun. 17, 2021

Related U.S. Application Data

(63) Continuation of application No. 16/920,305, filed on Jul. 2, 2020, now Pat. No. 10,939,360, which is a continuation of application No. PCT/CN2019/070048, filed on Jan. 2, 2019.

(30) Foreign Application Priority Data

Jan. 2, 2018 (WO) ................ PCT/CN2018/070045

(51) Int. Cl.
*H04W 48/00* (2009.01)
*H04W 48/10* (2009.01)
*H04W 72/23* (2023.01)

(52) U.S. Cl.
CPC .......... *H04W 48/10* (2013.01); *H04W 72/23* (2023.01)

(58) Field of Classification Search
CPC .............................. H04W 48/10; H04W 72/23
See application file for complete search history.

(56) References Cited

U.S. PATENT DOCUMENTS

| 11,362,878 | B2* | 6/2022 | Wilson | H04L 5/0053 |
| 2018/0192383 | A1* | 7/2018 | Nam | H04W 56/001 |
| 2019/0150121 | A1* | 5/2019 | Abdoli | H04L 27/2613 |
| | | | | 370/329 |

(Continued)

FOREIGN PATENT DOCUMENTS

| CN | 110651445 A | * | 1/2020 | ........... H04B 7/0413 |
| WO | 2017/213420 A1 | | 12/2017 | |

OTHER PUBLICATIONS

Huawei et al., "RMSI delivery", Nov. 27-Dec. 1, 2017, 11 pages, 3GPP TSG RAN WG1 Meeting #91, R1-1719372, Reno, Nevada.

(Continued)

*Primary Examiner* — Khai M Nguyen
(74) *Attorney, Agent, or Firm* — Nicholson De Vos Webster & Elliott LLP

(57) ABSTRACT

A method, network device and terminal device for providing remaining minimum system information (RMSI) in a wireless network. A method comprises determining whether a SS/PBCH block in the SS burst set configures the RMSI. In response to that the SS/PBCH block configures the RMSI, transmitting one or more repeated RMSI within a first periodicity.

22 Claims, 8 Drawing Sheets

(56) References Cited

U.S. PATENT DOCUMENTS

| | | | |
|---|---|---|---|
| 2019/0268205 A1 | 8/2019 | Shin et al. | |
| 2019/0306813 A1* | 10/2019 | Kim | H04W 56/001 |
| 2020/0059810 A1* | 2/2020 | Harada | H04W 48/10 |
| 2020/0178253 A1 | 6/2020 | Gao et al. | |
| 2020/0187093 A1* | 6/2020 | Awad | H04W 48/10 |
| 2020/0187159 A1 | 6/2020 | Ko et al. | |
| 2020/0205095 A1* | 6/2020 | Åström | H04W 48/12 |
| 2020/0244530 A1* | 7/2020 | Lin | H04W 72/1289 |
| 2020/0275409 A1* | 8/2020 | Gonzalez | H04W 88/185 |
| 2020/0275420 A1* | 8/2020 | Chen | H04W 68/00 |

OTHER PUBLICATIONS

Vivo, "Discussion on Remaining Minimum System Information", Oct. 9-13, 2017, 17 pages, 3GPP TSG RAN WG1 Meeting #90bis, R1-1717461, Prague, Czech Republic.

Zte et al., "NR-PBCH and Delivery of Minimum SI", Jan. 16-20, 2017, 10 pages, 3GPP TSG RAN WG1 AH_NR Meeting, R1-1700101, Spokane, Washington.

Motorola Mobility et al., "Indication of SS block timing information," Jun. 27-30, 2017, 4 pages, 3GPP TSG RAN WG1 NR Ad-Hoc #2, R1-1711276, Qingdao, P.R. China.

Notice of Allowance, KR App. No. 10-2022-7017505, dated Jun. 13, 2022, 5 pages (2 pages of English Translation and 3 pages of Original Document).

NTT Docomo, Inc., "New Radio (NR) Access Technology," Status Report to TSG, 3GPP TSG RAN meeting #78, RP-172461, Dec. 18-21, 2017, 335 pages.

Notice of Reasons for Refusal, JP App. No. 2020-536845, dated Mar. 29, 2022, 10 pages (5 pages of English Translation and 5 pages of Original Document).

Written Decision, KR App. No. 10-2020-7022286, dated Apr. 18, 2022, 4 pages (2 pages of English Translation and 2 pages of Original Document).

3GPP, "List of RAN1 Agreements", 3rd Generation Partnership Project, Mobile Competence Centre, F-06921 Sophia-Anti Polis Cedex, vol. RAN WG1, Sep. 2017, pp. 1-195.

3rd Generation Partnership Project; Technical Specification Group Radio Access Network; NR; Physical layer irocedures for control (Release 15), Dec. 2017, 56 pages, 3GPP TS 38.213 V2.0.0, 3GPP Organizational Partners.

International Preliminary Reporton Patentability, PCT App. No. PCT/CN2019/070048 , dated Jul. 16, 2020, 6 pages.

International Search Report and Written Opinion for International Application No. PCT/CN2019/070048, dated Mar. 22, 2019, 10 pages.

Non Final Office Action, U.S. Appl. No. 16/920,305, dated Sep. 1, 2020, 8 pages.

Notice of Allowance, U.S. Appl. No. 16/920,305, dated Dec. 22, 2020, 11 pages.

Offline summary for AI 7.1.2.2 Remaining details on Remaining Minimum System Information, Oct. 9-13, 2017, 15 pages, 3GPP TSG RAN WG1 Meeting 90bis, R1-1719198, Prague, CZ.

Presentation of Specification/Report to TSG: TS38.213, Version 2.0.0, Dec. 18-21, 2017,1 page, 3GPP TSG-*AN Meeting #78, Tdoc RP-172703, Lisbon, Portugal.

RAN1 Chairman's Notes, Nov. 27-Dec. 1, 2017, 189 pages, 3GPP TSG RAN WG1 Meeting 91, Reno, MV.

Remaining details of remaining minimum system information, Nov. 27-Dec. 1, 2017, 13 pages, 3GPP TSG RAN WG1 Meeting #91, R1-1721364, Reno, NV.

Supplementary European Search Report and Search Opinion, EP App. No. 19735854.2, dated Nov. 11, 2020, 14 pages.

Communication pursuant to Article 94(3) EPC, EP App. No. 19735854.2, dated Nov. 12, 2021, 8 pages.

Examination Report, IN App. No. 202047028183, dated Nov. 10, 2021, 6 pages.

Notice of Reasons for Refusal, JP App. No. 2020-536845, dated Aug. 13, 2021, 9 pages (2 pages of English Translation and 7 pages of Original Document).

Communication under Rule 71(3) EPC, EP App. No. 19735854.2, dated Mar. 10, 2023, 8 pages.

* cited by examiner

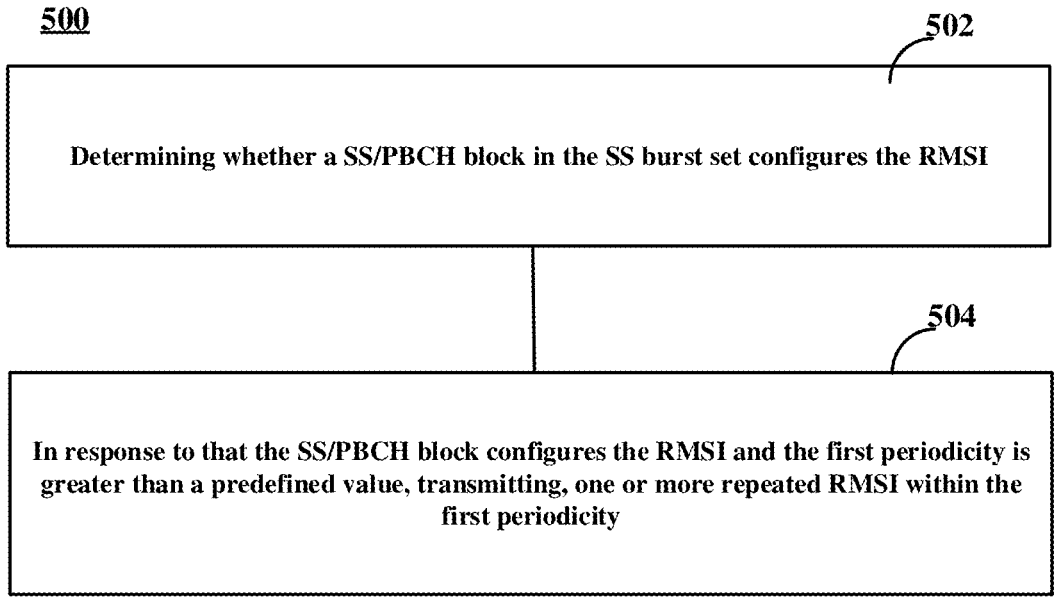
Fig. 5
| Bit index | 1 | 2 | 3 | 4 | 5 | 6 | 7 |
|---|---|---|---|---|---|---|---|
| | B0 | B1 | B2 | B3 | B4 | B5 | B6 |
A time window within the first SS burst set periodicity
Two time windows within the second SS burst set periodicity
Two time windows within the third SS burst set periodicity
Two time windows within the fourth SS burst set periodicity
Fig. 6
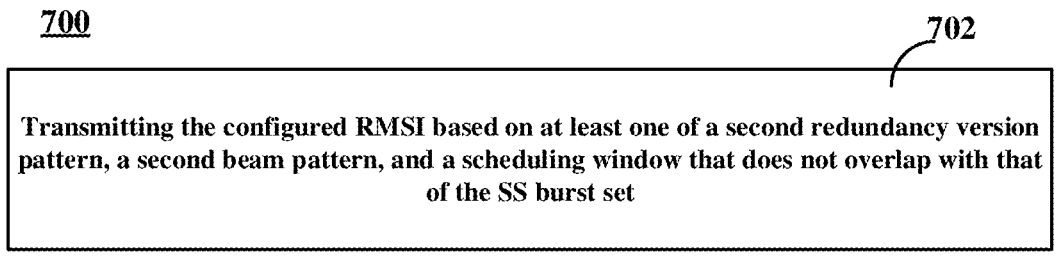
Fig. 7

1200 1202

Receiving user data originating from a transmission from a terminal device to a network device

Initiating a transmission carrying user data to the terminal device via the network device

Fig. 13

METHOD, NETWORK DEVICE AND TERMINAL DEVICE FOR REMAINING MINIMUM SYSTEM INFORMATION

CROSS-REFERENCE TO RELATED APPLICATIONS

This application is a continuation of application Ser. No. 16/920,305, filed Jul. 2, 2020, which is a continuation of International Application No. PCT/CN2019/070048, filed Jan. 2, 2019, which claims the benefit of International Application No. PCT/CN2018/070045, filed Jan. 2, 2018, which are all hereby incorporated by reference.

TECHNICAL FIELD

Embodiments of the disclosure generally relate to wireless communication, and, more particularly, to method, network device and terminal device for remaining minimum system information (RMSI).

BACKGROUND

In order to connect to a wireless network such as new radio (NR), a terminal device or user equipment (UE) needs to acquire network synchronization signals such as a primary synchronization signal (PSS) and a secondary synchronization signal (SSS) and obtain essential system information (SI). For example, in NR, the SI may be included in master information block (MIB) and remaining minimum system information (RMSI). The synchronization signals are used for adjusting the frequency of the UE relative to the network, and for finding proper timing of the received signal from the network.

In NR, a synchronization and access procedure may involve several signals:
  Primary synchronization signal (PSS) that allows for network detection in a presence of a high initial frequency error, up to tens of ppm.
  Secondary synchronization signal (SSS) that allows for more accurate frequency adjustments and channel estimation while at the same time providing fundamental network information, e.g. cell ID.
  Physical broadcast channel (PBCH) that provides a subset of the minimum system information for random access and configurations for fetching RMSI. It also provides timing information within a cell, e.g. to separate timing between beams transmitted from a cell. The amount of information to fit into the PBCH is limited to keep the size down. Furthermore, demodulation reference signals (DMRS) are interleaved with PBCH resources to receive it properly.
  Synchronization signal and PBCH block (SS/PBCH block, or SSB in shorter format) comprises the above signals (PSS, SSS and PBCH DMRS) and PBCH. SS/PBCH block may have 15 kHz, 30 kHz, 120 kHz or 240 kHz subcarrier spacing (SCS) depending on the frequency range.

A number of (typically rather close in time) SS/PBCH blocks constitute a SS burst set. A SS burst set is transmitted periodically with the periodicity configured in RMSI or by higher layer signaling. A 20 ms SS burst set periodicity is assumed for initial access.

FIG. 2 schematically shows SS/PBCH block symbols in slots for different SCSs in NR. As shown in FIG. 2, each small box denotes an orthogonal frequency division multiplexing (OFDM) symbol. In addition, for different SCSs, a length of the slot may be different though for the purpose of illustration, it is shown as the same for some SCSs. For a half frame with SS/PBCH blocks, the number and first symbol indexes for candidate SS/PBCH blocks are determined according to the SCS of SS/PBCH blocks as follows.
  Case A—15 kHz subcarrier spacing: the first symbols of the candidate SS/PBCH blocks have indexes of $\{2, 8\}+14*n$. For carrier frequencies smaller than or equal to 3 GHz, n=0, 1. For carrier frequencies larger than 3 GHz and smaller than or equal to 6 GHz, n=0, 1, 2, 3.
  Case B—30 kHz subcarrier spacing: the first symbols of the candidate SS/PBCH blocks have indexes $\{4, 8, 16, 20\}+28*n$. For carrier frequencies smaller than or equal to 3 GHz, n=0. For carrier frequencies larger than 3 GHz and smaller than or equal to 6 GHz, n=0, 1.
  Case C—30 kHz subcarrier spacing: the first symbols of the candidate SS/PBCH blocks have indexes $\{2, 8\}+14*n$. For carrier frequencies smaller than or equal to 3 GHz, n=0, 1. For carrier frequencies larger than 3 GHz and smaller than or equal to 6 GHz, n=0, 1, 2, 3.
  Case D—120 kHz subcarrier spacing: the first symbols of the candidate SS/PBCH blocks have indexes $\{4, 8, 16, 20\}+28*n$. For carrier frequencies larger than 6 GHz, n=0, 1, 2, 3, 5, 6, 7, 8, 10, 11, 12, 13, 15, 16, 17, 18.
  Case E—240 kHz subcarrier spacing: the first symbols of the candidate SS/PBCH blocks have indexes $\{8, 12, 16, 20, 32, 36, 40, 44\}+56*n$. For carrier frequencies larger than 6 GHz, n=0, 1, 2, 3, 5, 6, 7, 8.

FIG. 3 schematically shows SS burst set mapping to slots within 5 ms for different SCSs in NR. The candidate SS/PBCH blocks in a half frame are indexed in an ascending order in time from 0 to L−1. A UE shall determine the 2 least significant bit (LSB) bits, for L=4, or the 3 LSB bits, for L>4, of a SS/PBCH block index per half frame from a one-to-one mapping with an index of the DM-RS sequence transmitted for the PBCH. For L=64, the UE shall determine the 3 most significant bit (MSB) bits of the SS/PBCH block index per half frame from higher layer parameter SSB-index-explicit.

In NR, RMSI is carried in physical downlink shared channel (PDSCH) scheduled by physical downlink control channel (PDCCH) and contains the remaining subset of minimum system information, e.g. a bit map of the actually transmitted SS/PBCH blocks. RMSI can have 15 kHz, 30 kHz, 60 kHz or 120 kHz SCS.

After detecting one SS/PBCH block, UE may try to decode a corresponding RMSI to get remaining minimum system information based on the RMSI configurations in PBCH. Between SS/PBCH block and RMSI control resource set (CORESET), there may be 3 multiplexing types, each of which has a set of supported numerology combinations {SSB SCS, RMSI SCS}, as shown in FIG. 4. Note that type 2 and type 3 are only supported in over-6 GHz frequency bands. A kHz in {A kHz, B kHz} denotes SSB SCS and B kHz in {A kHz, B kHz} denotes RMSI SCS. In addition, the CORESET and the PDSCH may be transmitted in the same frequency band range but their frequency bands may be different.

In 3GPP RAN1 #91 meeting, a RMSI transmission time interval (TTI) is agreed to be 160 ms, there's no RMSI periodicity indicated in PBCH and a RMSI scheduling periodicity is up to gNB implementation. Therefore, it would be desirable to provide a solution for RMSI in the wireless network such as NR.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

According to an aspect of the disclosure, it is provided a method for transmitting remaining minimum system information (RMSI) in a wireless network, wherein a physical broadcast channel (PBCH) provides a first subset of minimum system information for random access and configurations for fetching the remaining subset of the minimum system information, the RMSI, a number of synchronization signal (SS)/PBCH blocks constitute a SS burst set which is transmitted periodically with a first periodicity, the method comprises: determining whether a SS/PBCH block in the SS burst set configures the RMSI; in response to that the SS/PBCH block configures the RMSI, transmitting one or more repeated RMSI within the first periodicity.

According to another aspect of the disclosure, it is provided a method for receiving remaining minimum system information (RMSI) in a wireless network, wherein a physical broadcast channel (PBCH) provides a subset of minimum system information for random access and configurations for fetching the other subset of the minimum system information in the RMSI, a number of synchronization signal (SS)/PBCH blocks constitute a SS burst set which is transmitted periodically with a first periodicity, the method comprises: determining whether a SS/PBCH block in the SS burst set configures the RMSI; in response to that the SS/PBCH block configures the RMSI, receiving one or more repeated RMSI within the first periodicity.

According to another aspect of the disclosure, it is provided a network device comprising: a processor; and a memory, the memory containing instructions executable by the processor, whereby the apparatus is operative to: determine whether a SS/PBCH block in the SS burst set configures the RMSI; in response to that the SS/PBCH block configures the RMSI and the first periodicity is greater than a predefined value, transmit one or more repeated RMSI within the first periodicity.

According to another aspect of the disclosure, it is provided a terminal device comprising: a processor; and a memory, the memory containing instructions executable by the processor, whereby the apparatus is operative to: determine whether a SS/PBCH block in the SS burst set configures the RMSI; in response to that the SS/PBCH block configures the RMSI and the first periodicity is greater than a predefined value, receive one or more repeated RMSI within the first periodicity.

According to another aspect of the disclosure, it is provided a computer program product. The computer program product comprises instructions which when executed by at least one processor, cause the at least one processor to determine whether a SS/PBCH block in the SS burst set configures the RMSI; in response to that the SS/PBCH block configures the RMSI and the first periodicity is greater than a predefined value, transmit one or more repeated RMSI within the first periodicity.

According to another aspect of the disclosure, it is provided a computer readable storage medium. The computer readable storage medium comprises instructions which when executed by at least one processor, cause the at least one processor to determine whether a SS/PBCH block in the SS burst set configures the RMSI; in response to that the SS/PBCH block configures the RMSI and the first periodicity is greater than a predefined value, transmit one or more repeated RMSI within the first periodicity.

According to another aspect of the disclosure, it is provided a computer program product. The computer program product comprises instructions which when executed by at least one processor, cause the at least one processor to determine whether a SS/PBCH block in the SS burst set configures the RMSI; in response to that the SS/PBCH block configures the RMSI and the first periodicity is greater than a predefined value, receive one or more repeated RMSI within the first periodicity.

According to another aspect of the disclosure, it is provided a computer readable storage medium. The computer readable storage medium comprises instructions which when executed by at least one processor, cause the at least one processor to determine whether a SS/PBCH block in the SS burst set configures the RMSI; in response to that the SS/PBCH block configures the RMSI and the first periodicity is greater than a predefined value, receive one or more repeated RMSI within the first periodicity.

According to another aspect of the disclosure, it is provided a method implemented in a communication system including a host computer, a network device and a terminal device, the method comprising: at the host computer, receiving user data originating from a transmission from a terminal device to a network device, wherein the network device is operative to configured to perform the method as described above, wherein the terminal device is operative to configured to perform the method as described above.

According to another aspect of the disclosure, it is provided a method implemented in a communication system including a host computer, a network device and a terminal device, the method comprising: at the host computer, initiating a transmission carrying user data to the terminal device via the network device, wherein the network device is operative to configured to perform the method as described above, wherein the terminal device is operative to configured to perform the method as described above.

According to another aspect of the disclosure, it is provided a communication system including a host computer comprising: a processing circuitry configured to provide user data; and a communication interface configured to receive user data originating from a transmission from a terminal device to a network device, wherein the network device comprises a processor and a memory, the memory containing instructions executable by the processor, whereby the network device is operative to configured to perform the method as described above, wherein the terminal device comprises a processor and a memory, the memory containing instructions executable by the processor, whereby the terminal device is operative to configured to perform the method as described above.

According to another aspect of the disclosure, it is provided a communication system including a host computer comprising: a processing circuitry configured to provide user data; and a communication interface configured to initiate a transmission carrying user data to a terminal device via a network device, wherein the network device comprises a processor and a memory, the memory containing instructions executable by the processor, whereby the network device is operative to configured to perform the method as described above, wherein the terminal device comprises a processor and a memory, the memory containing instructions executable by the processor, whereby the terminal device is operative to configured to perform the method as described above.

According to another aspect of the disclosure, a method for transmitting RMSI is provided by comprising: transmitting PDCCH scheduling information; determining whether a slot-based or non-slot-based scheduling on PDSCH is predefined based on the transmitted PDCCH scheduling information, wherein the RMSI is to be carried in the PDSCH; determining location of the PDSCH according to the determination of a slot-based or non-slot-based scheduling on PDSCH by which the RMSI to be carried, and multiplexing pattern between SS/PBCH block and CORESET; and transmitting the RMSI through the PDSCH. A corresponding apparatus is also provided.

According to another aspect of the disclosure, a method for receiving RMSI is provided by comprising: receiving PDCCH scheduling information; determining whether a slot-based or non-slot-based scheduling on PDSCH is predefined based on the received PDCCH scheduling information, wherein the RMSI is to be carried in the PDSCH; determining location of the PDSCH according to the determination of a slot-based or non-slot-based scheduling on PDSCH by which the RMSI to be carried, and multiplexing pattern between SS/PBCH block and CORESET; and monitoring location of PDSCH carrying the RMSI. A corresponding apparatus is also provided.

These and other objects, features and advantages of the disclosure will become apparent from the following detailed description of illustrative embodiments thereof, which are to be read in connection with the accompanying drawings.

BRIEF DESCRIPTION OF THE DRAWINGS

FIG. 5 is a flow chart depicting a method according to an embodiment of the present disclosure;

FIG. 6 shows the bitmap of one or more time windows within the first periodicity according to an embodiment of the present disclosure;

FIG. 7 is a flow chart depicting a method according to another embodiment of the present disclosure;

FIG. 12 is a flow chart depicting a method implemented in a communication system according to an embodiment of the disclosure; and FIG. 13 is a flow chart depicting a method implemented in a communication system according to another embodiment of the disclosure.

DETAILED DESCRIPTION

Figure 1:
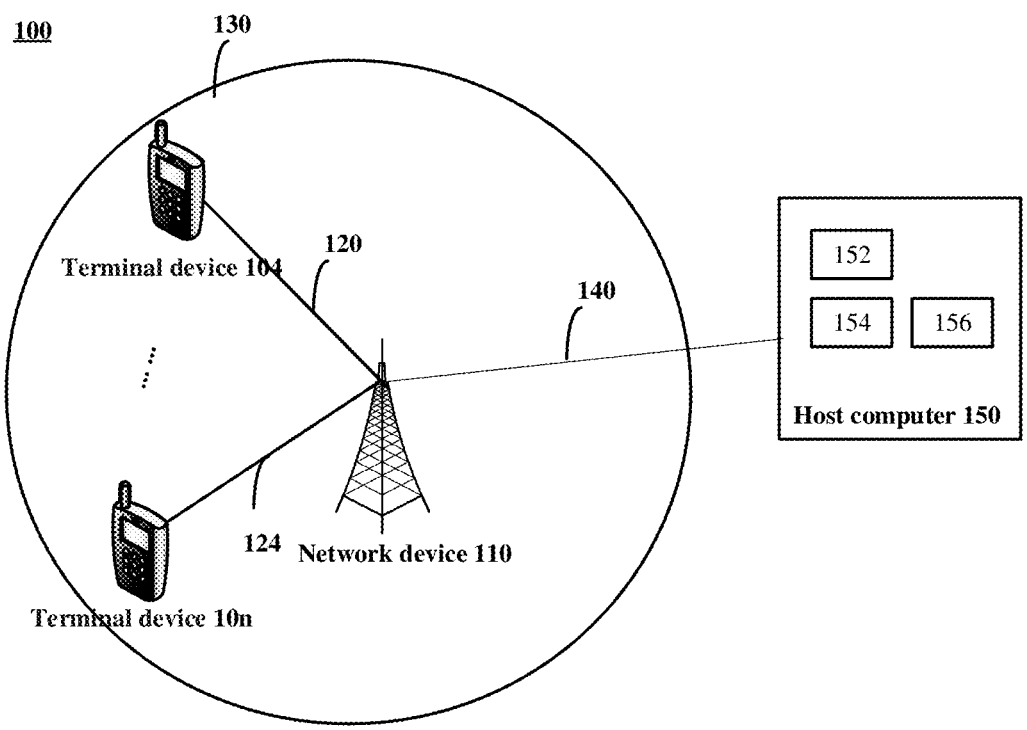
FIG. 1 depicts a schematic communication system, in which some embodiments of the present disclosure can be implemented.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "wireless communication network" or "wireless network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols such as NR, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As described above, in 3GPP RAN1 #91 meeting, the RMSI TTI is agreed to be 160 ms, there's no RMSI periodicity indicated in PBCH, and the RMSI scheduling periodicity is up to gNB implementation. One-to-one association between one SS/PBCH block and one RMSI in wideband operation is assumed in 3GPP release 15. Thus, in one 160 ms RMSI TTI, the number of RMSI repetitions will be no more than the additional SS/PBCH block, considering that some SS/PBCH block in some SS burst set may have no RMSI associated.

On one hand, one possible issue is that if the SS burst set periodicity may be too long, the SS burst set might even be only transmitted every other SSB TTI (such as 80 ms) and probably in later 3GPP releases there could be more-to-one association between SSB and RMSI, thus the performance of the RMSI might not be acceptable without additional repetitions for soft combining with same or different redundancy versions.

On the other hand, it might be not so flexible for RMSI or other data channel scheduling if the RMSI messages are transmitted without some defined patterns (e.g. beam patterns, redundancy version patterns) especially when it's not necessary to have as many RMSI messages as SS/PBCH blocks. And in this case if slot-based scheduling of RMSI is used, it may take more time per sweep on RMSI transmission than what is needed for SSB transmission.

The present disclosure proposes a solution for RMSI in the wireless network such as NR. It may overcome at least one of the drawbacks mentioned above and/or other drawbacks not mentioned above. It is noted that though the embodiments are mainly described in the context of the NR system, they are not limited to this but can be applied to any suitable wireless system.

Now some exemplary embodiments of the present disclosure will be described below with reference to the figures.

FIG. 1 depicts a schematic communication system, in which some embodiments of the present disclosure can be implemented. As shown in FIG. 1, the communication system 100 comprises a network device 110 such as a cellular base station, for example a gNB in NR. The network device 110 may refer to a function element on the network side as compared to a terminal device or UE. For example, the network device 110 may comprise an eNB, a Home eNode B, a femto Base Station, a pico BS, gNB or any other node capable to serve terminal devices 104-10n in the system 100. It is well known that a cellular radio system may comprise a network of radio cells each served by a transmitting station, known as a cell site or base transceiver station. The radio network provides wireless communications service for a plurality of transceivers (in most cases mobile). The network of network devices working in collaboration allows for wireless service which is greater than the radio coverage provided by a single network device. The individual network device may be connected by another network (in many cases a wired network, not shown), which includes additional controllers for resource management and in some cases access to other network systems (such as the Internet) or metropolitan area networks (MANs). The circle 130 schematically indicates a coverage range of the network device 110.

As shown in FIG. 1, the communication system 100 may comprise one or more UEs or terminal devices 104-10n, each of which may operably communicate with the network device 110 such as a cellular base station through a wireless link, such as link 120 and 124. The terminal devices 104-10n can be fixed or moveable. Terminal devices 104-10n may include, but not limited to, cellular telephones, smart phones, and computers, whether desktop, laptop, or otherwise, as well as mobile devices or terminals such as cellular network UEs, machine type communication devices, handheld computers, personal digital assistants (PDAs), wireless sensors, wearable devices, video cameras, set-top boxes, personal media devices, or any combinations of the foregoing, which may be provided with wireless communication functionality and run with any kind of operating system including, but not limited to, Windows, Linux, UNIX, Android, iOS and their variants.

In addition, though only one network device 110 is shown in FIG. 1, there may be two or more network devices such that some terminal devices are within the coverage range of first network device, some terminal devices are within the coverage range of second network device, and some terminal devices are at the border of the coverage ranges of two or more network devices, and so on. In the latter case, the terminal devices may receive signals from each of the two or more network devices.

The network device 110 may be connected to a host computer 150, which may be embodied in the hardware and/or software of a standalone server, a cloud-implemented server, a distributed server or as processing resources in a server farm. Host computer 150 may be under the ownership or control of a service provider, or may be operated by the service provider or on behalf of the service provider. A connection 140 between the network device 110 and the host computer 150 may extend directly from core network to the host computer 150 or may go via an optional intermediate network (not shown). The intermediate network may be one of, or a combination of more than one of, a public, private or hosted network; the intermediate network, if any, may be a backbone network or the Internet; in particular, the intermediate network may comprise two or more sub-networks (not shown).

The communication system 100 as a whole enables connectivity between the connected UEs 104-10n and the host computer 150. The connectivity may be described as an over-the-top (OTT) connections {124, 140} and {120, 140}. The host computer 150 and the connected UEs 104-10n are configured to communicate data and/or signaling via OTT connections, using an access network (not shown), a core network (not shown), any intermediate network (not shown) and possible further infrastructure (not shown) as intermediaries. The OTT connections {124, 140} and {120, 140} may be transparent in the sense that the participating communication devices through which the OTT connections passes are unaware of routing of uplink and downlink communications. For example, the network device 110 may not or need not be informed about the past routing of an incoming downlink communication with data originating from the host computer 150 to be forwarded (e.g., handed over) to a connected UE 104. Similarly, the host computer 150 need not be aware of the future routing of an outgoing uplink communication originating from the UE 104 towards the host computer 150.

In communication system 100, host computer 150 comprises hardware including communication interface 152 configured to set up and maintain a wired or wireless connection with an interface of a different communication device of communication system 100. Host computer 150 further comprises processing circuitry 154, which may have storage and/or processing capabilities. In particular, processing circuitry 154 may comprise one or more programmable processors, application-specific integrated circuits, field programmable gate arrays or combinations of these (not shown) adapted to execute instructions. Host computer 150 further comprises software 156, which is stored in or accessible by host computer 150 and executable by processing circuitry 154. Software 156 includes host application. Host application may be operable to provide a service to a remote user, such as terminal device 104 connecting via OTT connection {120, 140} terminating at terminal device 104 and host computer 150. In providing the service to the remote user, host application may provide user data which is transmitted using OTT connection {120, 140}. In an embodiment, the communication interface 152 is configured to receive user data originating from a transmission from the terminal device to the network device. In another embodiment, the communication interface 152 is configured to initiate a transmission carrying user data to the terminal device via the network device.

FIG. 5 is a flow chart depicting a method for transmitting RMSI in a wireless network according to an embodiment of the present disclosure, which may be performed at an apparatus such as the network device 110 of FIG. 1. As such, the network device 110 may provide means for accomplishing various parts of the method 500 as well as means for accomplishing other processes in conjunction with other components.

The wireless network may be NR or other suitable wireless network where the RMSI is required to be transmitted. In the wireless network such as NR, the PBCH may provide a subset of minimum system information for random access and configurations for fetching the other subset of the minimum system information in the RMSI, a number of synchronization signal (SS)/PBCH blocks constitute a SS burst set which is transmitted periodically with a first periodicity configured in the RMSI or via higher layer parameters. The first periodicity may be 20 ms, 40 ms, 80 ms or other suitable value.

As shown in FIG. 5, the method 500 may start at block 502 where the network device 110 determines whether a SS/PBCH block in the SS burst set configures the RMSI. For example, the SS/PBCH block in the SS burst set may configure RMSI control resource set (CORESET) which may indicate the location of RMSI physical downlink shared channel (PDSCH) comprising the RMSI in NR. The SS/PBCH block may or may not configure the RMSI due to some possible reasons.

At block 504, the network device 110, in response to that the SS/PBCH block configures the RMSI and the first periodicity is greater than a predefined value, transmit, one or more repeated RMSI within the first periodicity. The network device 110 may transmit one or more repeated RMSI within the first periodicity by using any suitable approaches.

In an embodiment, the network device 110 may transmit one or more repeated RMSI within the first periodicity based on at least one of a second periodicity, a first redundancy version pattern, a first beam pattern, a bitmap of one or more time windows within the first periodicity. A bit in the bitmap indicates whether one of the one or more repeated RMSIs is transmitted in a corresponding time window and the at least one of the second periodicity, the first redundancy version pattern, the first beam pattern, the bitmap is indicated to a terminal device in the RMSI or in a higher layer message or predefined. The predefined value may be 20 ms or any other suitable value.

In an embodiment, when the one or more RMSIs are repeated, the network device 110 can transmit only one or more repeated RMSI PDSCHs comprising the RMSI based on at least one of the second periodicity, the first redundancy version pattern, the first beam pattern and the bitmap. In this embodiment, the CORESET may be not transmitted.

In another embodiment, when the one or more RMSIs are repeated, the network device 110 can transmit both the CORESETs and the RMSI PDSCHs, wherein the CORESETs may be transmitted based on at least one of the second periodicity, the first redundancy version pattern, the first beam pattern and the bitmap. In this embodiment, the locations of the RMSI PDSCHs are indicated by the CORESETs.

In still another embodiment, when the one or more RMSIs are repeated, the network device 110 can transmit both the repeated CORESETs and the repeated RMSI PDSCHs based on at least one of the second periodicity, the first redundancy version pattern, the first beam pattern and the bitmap.

In an embodiment, the network device 110, in response to that the SS/PBCH block configures the RMSI and the first periodicity is greater than a predefined value, transmits, one or more repeated RMSI within the first periodicity, based on the second periodicity. The second periodicity may comprise 20 ms, 40 ms, 80 ms or any other suitable value. The second periodicity may be indicated by a RMSI repetition field RMSI_repAdd, which may occupy any suitable number of bits such as 2 bits. For example, RMSI_repAdd may be defined as below:

00→no additional repetition
01→repeating with 20 ms periodicity
02→repeating with 40 ms periodicity
03→repeating with 80 ms periodicity In an embodiment, there is a correspondence between the first periodicity and the second periodicity. For example, If SS burst set periodicity (i.e., the first periodicity) should be considered, the value of RMSI_repAdd can be, for example, confined in a set of values shown in below table I:

TABLE I

| SS burst set periodicity | Values of RMSI_repAdd |
|---|---|
| <=20 ms | 00 |
| 40 ms | 00 or 01 |
| 80 ms | 00 or 01 or 02 |
| 160 ms, i.e. SSB sent every other SSB TTI | 00 or 01 or 02 or 03 |

As shown in table I, when the SS burst set periodicity is less than or equals to 20 ms, then the value of RMSI_repAdd can be set as 00, which means no additional repetition. When the SS burst set periodicity is 40 ms, then the value of RMSI_repAdd can be set as 00 or 01, which means no additional repetition or repeating with 20 ms periodicity. In addition, there may be a one-to-one correspondence between the first periodicity and the second periodicity. For example, one possible one-to-one correspondence between the first periodicity and the second periodicity is shown in below table II:

TABLE II

| SS burst set periodicity | Values of RMSI_repAdd |
|---|---|
| <=20 ms | 00 |
| 40 ms | 01 |
| 80 ms | 02 |
| 160 ms, i.e. SSB sent every other SSB TTI | 03 |

Moreover any other suitable one-to-one correspondence between the first periodicity and the second periodicity can be used in addition to that shown in table II.

In another embodiment, the network device 110, in response to that the SS/PBCH block configures the RMSI and the first periodicity is greater than a predefined value, transmit, one or more repeated RMSI within the first periodicity, based on the bitmap of one or more time windows within the first periodicity. The size of the time windows may be 20 ms or any other suitable value. FIG. 6 shows the bitmap of one or more time windows within the first periodicity according to an embodiment of the present disclosure. As shown in FIG. 5, the SS burst set periodicity (i.e., the first periodicity) is 40 ms and RMSI TTI can be evenly divided to 8 time windows, each of which is 20 ms, and the 1st 20 ms is the time window in which RMSI is firstly received based on the RMSI configuration in one SSB. Additional RMSI repetition bits, RMSI_repAdd_bitmap, e.g. 7 bits (B6, B5, B4, B3, B2, B1 and B0), may be used to indicate which of the 20 ms time windows in the latter seven 20 ms periods in the RMSI TTI has additional RMSI (including RMSI CORESET or RMSI PDSCH only) or not. Bn=1 means additional RMSI (including RMSI CORESET or RMSI PDSCH only) is in the corresponding 20 ms period and Bn=0 means no additional RMSI (including RMSI CORESET or RMSI PDSCH only) in the corresponding 20 ms period. For example, B1 may be set as 1 which means additional RMSI (including CORESET or PDSCH only) is transmitted in the 20 ms period corresponding to B1.

In addition, if one of the two or more time windows within the first periodicity is used to transmit the RMSI, the one of the two or more time windows is not used to transmit the repeated RMSI. For example, Bn can be set as 0 if the corresponding 20 ms period includes one SS burst set. Within the time window such as 20 ms, the timing frequency relative position of the one or more repeated RMSIs can be same as the one indicated by the SSB.

Besides the second periodicity and the bitmap, more signaling can also be indicated in RMSI or higher layer messages to provide redundancy version (RV) patterns and/or beam patterns of the one or more repeated RMSIs. Alternatively, to reduce the overhead of the signaling, some fixed RV/beam pattern of the one or more repeated RMSIs can be predefined without any extra explicit signaling.

For example, assuming that 4 SSBs denoted by indexes SSB1, SSB2, SSB3, SSB4 are transmitted with a periodicity of 40 ms and the RMSI repetitions (e.g., RMSI CORESETs and/or RMSI PDSCHs) are transmitted every 20 ms. The first 20 ms period could contain a first transmission of {SSB1, SSB2, SSB3, SSB4} during 2 slots followed by slot-based RMSI repetitions containing a redundancy version (denoted by RV1) of RMSI repetitions {RMSI1-RV1, RMSI2-RV1, RMSI3-RV1, RMSI4-RV1} during 2 slots. The next 20 ms period contains another redundancy version (denoted by RV2) of the RMSI repetitions {RMSI1-RV2, RMSI2-RV2, RMSI3-RV2, RMSI4-RV2}, wherein "n" in RMSIn denotes the RMSI index corresponding to the SS/PBCH block index "n", and "n" in RVn denotes the redundancy version number.

As another example, assuming that 4 SSBs are transmitted with a periodicity of 40 ms and the RMSI repetitions are transmitted every 20 ms in NR. The first 20 ms period could contain a first transmission of {SSB1, SSB2, SSB3, SSB4} during 2 slots followed by slot-based RMSI repetitions transmitted by a beam pattern (denoted by BP1) {RMSI1-BP1, RMSI2-BP1, RMSI3-BP1, RMSI4-BP1} during 2 slots. The next 20 ms period contains another beam pattern (denoted by BP2) of the RMSI repetitions {RMSI1-BP2, RMSI2-BP2, RMSI3-BP2, RMSI4-BP2}, wherein "n" in BPn denotes the beam pattern number.

In addition, both the RV patterns and beam patterns can be used to indicate how to transmit the repeated RMSI. For example, one repeated RMSI may contain a redundancy version 1 of RMSI and be transmitted by the beam pattern 1, another repeated RMSI may contain a redundancy version 2 of RMSI and be transmitted by the beam pattern 2.

In an embodiment, repetitive timing frequency positions of the one or more repeated RMSIs are determined by the one indicated by the SS/PBCH block in the SS burst set based on a predefined rule. As an example, if the second periodicity is 20 ms, the first periodicity is 40 ms and the RMSI CORESET and RMSI PDSCH are transmitted at x ms and y ms respectively within the beginning 20 ms of the first periodicity, then the first repeated RMSI CORESET and/or RMSI PDSCH may be transmitted at x+20 ms and/or y+20 ms respectively, wherein x and y denotes a rational number respectively. As another example, when the bitmap of one or more time windows within the first periodicity is used, within the time window such as 20 ms, the timing frequency relative position of the one or more repeated the repeated RMSI CORESET and/or RMSI PDSCH can be same as the one indicated by the SS/PBCH block. In addition, any other suitable predefined rules may be defined in other embodiments, for example, offset.

FIG. 7 is a flow chart depicting a method for transmitting RMSI in a wireless network according to an embodiment of the present disclosure, which may be performed at an apparatus such as the network device 110 of FIG. 1. As such, the network device 110 may provide means for accomplishing various parts of the method 700 as well as means for accomplishing other processes in conjunction with other components.

As shown in FIG. 7, the method 700 may start at block 702 where the network device 110 transmits the configured RMSI based on at least one of a second redundancy version pattern, a second beam pattern, and a scheduling window that does not overlap with that of the SS burst set, wherein the at least one of the second redundancy version pattern, the second beam pattern, and the scheduling window is indicated to a terminal device in the RMSI or in a higher layer message or predefined.

In an embodiment, the network device 110 transmits the configured RMSI based on the second redundancy version pattern. Assuming that the SS burst set periodicity is 20 ms and the RMSI TTI is 160 ms and each SS/PBCH block configures respective RMSIs, then there will be 8 configured RMSIs (i.e., RMSI PDSCHs and RMSI CORESETs) corresponding to each SS/PBCH block index to be transmitted in the RMSI TTI. The 8 configured RMSIs can be transmitted based on the second redundancy version pattern. As an example, the 8 configured RMSIs can be transmitted based on the redundancy version pattern (denoted by RV) {RMSI1-RV1, RMSI1-RV2, RMSI1-RV3, RMSI1-RV4, RMSI1-RV1, RMSI1-RV2, RMSI1-RV3, RMSI1-RV4}.

In another embodiment, the network device 110 transmits the configured RMSI based on the second beam pattern. As an example, the above 8 configured RMSIs can be transmitted based on the beam pattern (denoted by BP) {RMSI1-BP1, RMSI1-BP2, RMSI1-BP3, RMSI1-BP4, RMSI1-BP1, RMSI1-BP2, RMSI1-BP3, RMSI1-BP4}.

Figure 2:
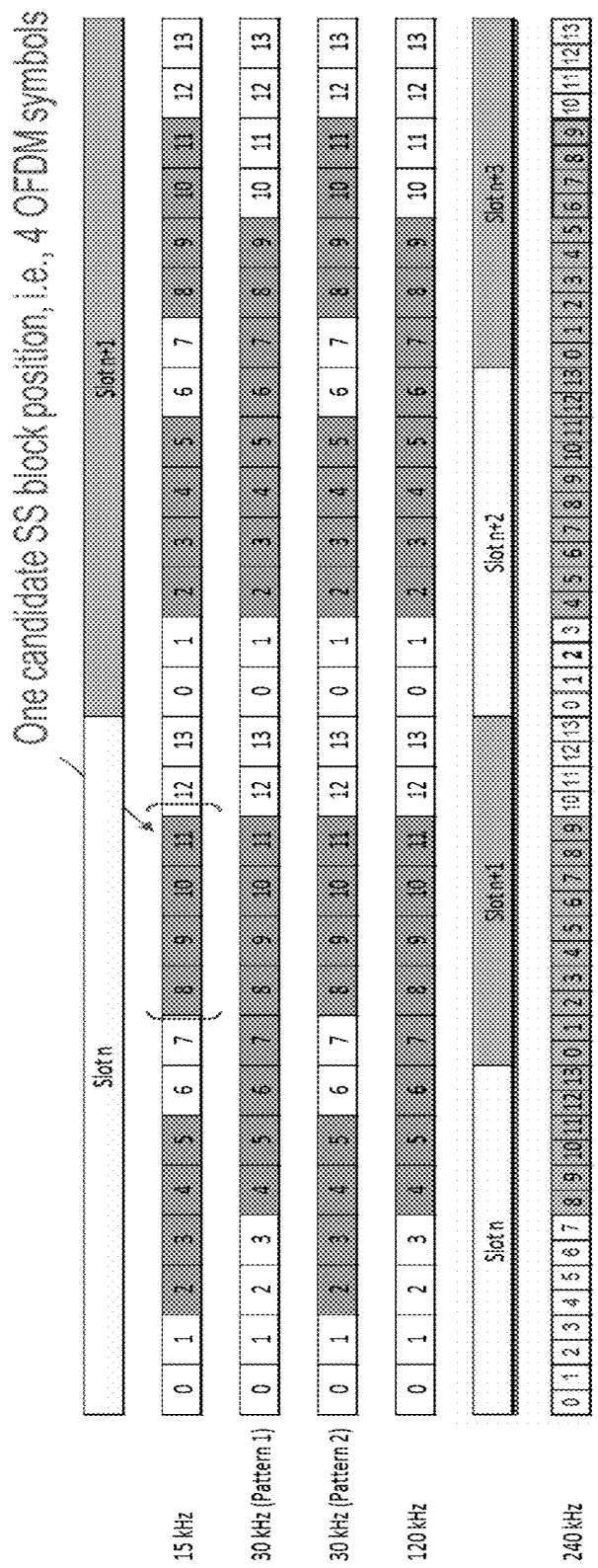
FIG. 2 schematically shows SS/PBCH block symbols in slots for different SCSs in NR.
Figure 3:
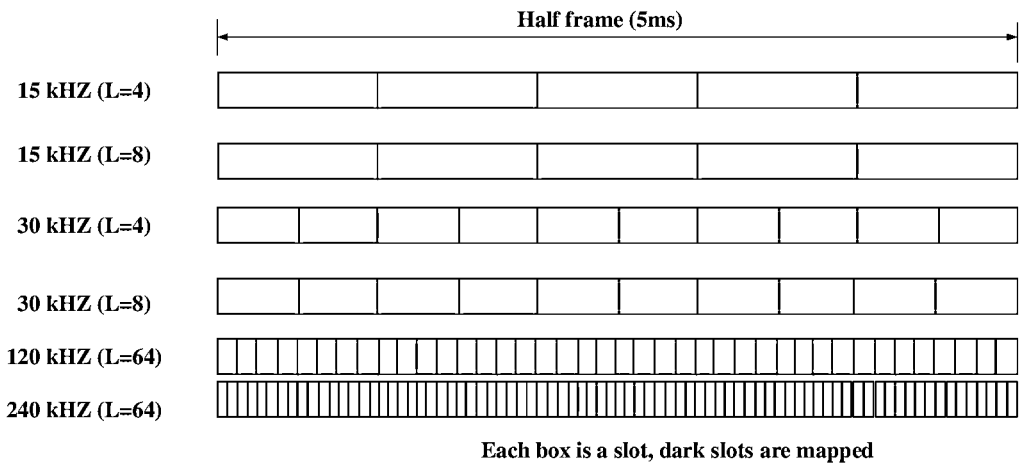
FIG. 3 schematically shows SS burst set mapping to slots within 5 ms for different SCSs in NR.
Figure 4:
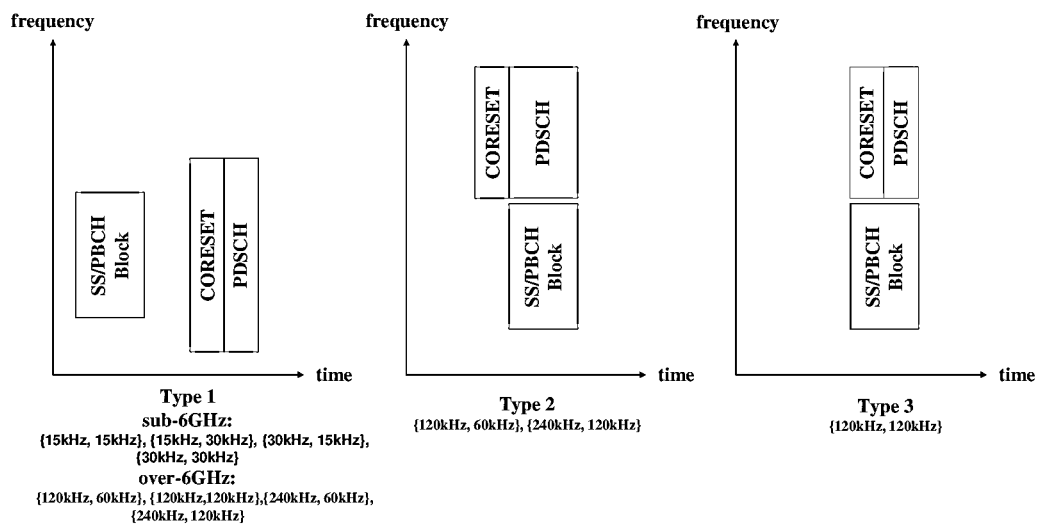
FIG. 4 schematically shows multiplexing types between SS/PBCH block and RMSI control resource set (CORESET)

In addition, it may be also good to reduce the number of RMSI repetitions for flexible network scheduling of both RMSI and other data channels. In this case, different RMSI redundancy versions and/or beam patterns can be mapped to different SS block duration time windows. For example, assuming that the SS burst set periodicity is 20 ms while RMSI repetitions are transmitted every 40 ms. It can then be further indicated if the RMSI repetitions are transmitted using slot-based or non-slot-based scheduling (previously known as mini-slots). When "Type 1 SS/PBCH block and RMSI CORESET multiplexing pattern" is used (see FIG. 4) the RMSI transmissions may occur in either normal slots or in "mini-slots". Since the SS/PBCH block consists of 4 symbols (see FIG. 2), it is possible to transmit 2 SS/PBCH blocks in one slot while only one RMSI repetition can be transmitted per slot when slot-based transmission is used. To avoid having to spend more time per sweep on RMSI transmission than what is needed for SSB transmission, one solution is to transmit half of the RMSI repetitions in each sweep and to toggle between RMSI repetitions being transmitted in odd sweeps versus even sweeps in odd or even beams respectively.

As an example, assuming that 4 SSBs are transmitted in each sweep with a periodicity of 20 ms and the RMSI repetitions are transmitted in separate sweeps every 40 ms. The first sweep could then contain a first transmission of {SSB1, SSB2, SSB3, SB4} during 2 slots followed by slot-based RMSI repetitions containing a redundancy version 1 (denoted by RV1) for the odd beams {RMSI1-RV1, RMSI3-RV1} during 2 slots. The next 20 ms period would then again consists of the 4 SSBs {SSB1, SSB2, SSB3, SB4} transmitted during 2 slots followed by slot-based RMSI repetitions containing the redundancy version 1 for the even beams {RMSI2-RV1, RMSI4-RV1} during 2 slots. The next 40 ms period would then contain, in addition to the SSB transmissions, the redundancy version 2 of the RMSI repetitions {RMSI1-RV2, RMSI3-RV2} and {RMSI2-RV2, RMSI4-RV2} and so on. Note that instead of "odd/even" RMSI repetitions, one could equally well transmit "high/low" RMSI repetitions in different 20 ms sweeps. This arrangement is useful when it is not necessary to have 8 different RMSI redundancy version transmissions during the RMSI TTI of 160 ms. By distributing the RMSI repetitions for different beams over different 20 ms windows, a more even spread of RMSI overhead can be obtained during the 160 ms time interval.

In another embodiment, the configured RMSI may be assigned with a non-overlapping scheduling window. In case the RMSIs are transmitted more seldom than the SS/PBCH blocks in the RMSI TTI, then this allows for some scheduling flexibility of the RMSI on the network side. If the SSBs periodicity is for example 20 ms and the SSBs are all transmitted in the first 5 ms part of this time window, then a sub-set of the RMSI transmissions (e.g. odd/even or high/low RMSI index) need to be transmitted in the remaining 15 ms part of the time window. By distributing the RMSI transmissions in scheduling windows over this latter 15 ms part of the SSB periodicity, a greater flexibility in RMSI beam-forming and scheduling can be achieved. With some flexibility in RMSI scheduling, the chance increases that the RMSI can be transmitted together with user data in the same beam. This may result in a better resource utilization overall, especially when analogue transmission beam forming is used on the network side.

In an embodiment, a slot-based or non-slot-based scheduling is indicated to a terminal device in the RMSI or in a higher layer message or predefined.

In an embodiment, the content of the RMSI corresponding to a SS/PBCH block index, when transmitted in a RMSI TTI such as 160 ms, is not changed. In this case, it can support RMSI soft combining from two or more transmitted RMSIs.

Figure 8:
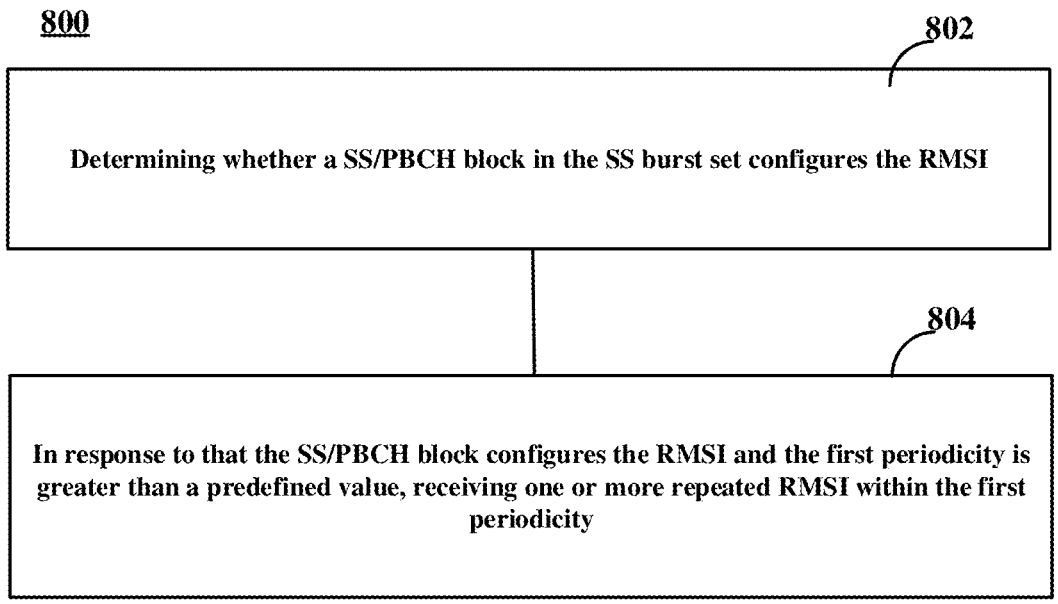
FIG. 8 is a flow chart depicting a method according to an embodiment of the present disclosure.

FIG. 8 is a flow chart depicting a method for receiving RMSI in a wireless network according to an embodiment of the present disclosure, which may be performed at an apparatus such as the terminal device 102 of FIG. 1. As such, the terminal device may provide means for accomplishing various parts of the method 800 as well as means for accomplishing other processes in conjunction with other components. For some parts which have been described in the above embodiments, detailed description thereof is omitted here for brevity. In this embodiment, the physical broadcast channel (PBCH) provides a subset of minimum system information for random access and configurations for fetching the other subset of the minimum system information in the RMSI, a number of synchronization signal (SS)/PBCH blocks constitute a SS burst set which is transmitted periodically with a first periodicity.

As shown in FIG. 8, the method 800 may start at block 802 where the terminal device 102 determines whether a SS/PBCH block in the SS burst set configures the RMSI.

At block 804, the terminal device 102, in response to that the SS/PBCH block configures the RMSI and the first periodicity is greater than a predefined value, receives, one or more repeated RMSI within the first periodicity. the terminal device 102 may receive one or more repeated RMSI within the first periodicity by using any suitable approaches. In an embodiment, the network device 110 may receive one or more repeated RMSI within the first periodicity by using any suitable approaches based on at least one of a second periodicity, a first redundancy version pattern, a first beam pattern and a bitmap of one or more time windows within the first periodicity.

Figure 9:
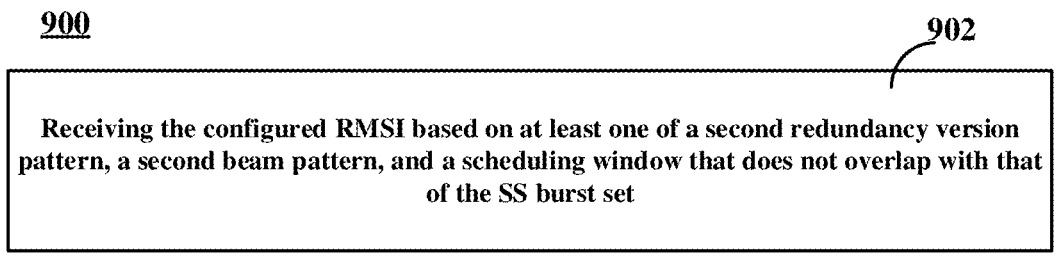
FIG. 9 is a flow chart depicting a method according to another embodiment of the present disclosure.

FIG. 9 is a flow chart depicting a method for receiving RMSI in a wireless network according to an embodiment of the present disclosure, which may be performed at an apparatus such as the terminal device 102 of FIG. 1. As such, the terminal device may provide means for accomplishing various parts of the method 900 as well as means for accomplishing other processes in conjunction with other components. For some parts which have been described in the above embodiments, detailed description thereof is omitted here for brevity.

As shown in FIG. 9, the method 900 may start at block 902 where the terminal device 102 receives the configured RMSI based on at least one of a second redundancy version pattern, a second beam pattern, and a scheduling window that does not overlap with that of the SS burst set, wherein the at least one of the second redundancy version pattern, the second beam pattern, and the scheduling window is indicated to a terminal device in the RMSI or in a higher layer message or predefined.

In an embodiment, a bit in the bitmap indicates whether one of the one or more repeated RMSIs is transmitted in a corresponding time window.

In an embodiment, the at least one of the second periodicity, the first redundancy version pattern, the first beam pattern, the bitmap is indicated to a terminal device in the RMSI or in a higher layer message or predefined.

In an embodiment, a slot-based or non-slot-based scheduling is indicated to a terminal device in the RMSI or in a higher layer message or predefined.

In an embodiment, there is a correspondence between the first periodicity and the second periodicity.

In an embodiment, repetitive timing frequency positions of the one or more repeated RMSIs are determined by the one indicated by the SS/PBCH block in the SS burst set based on a predefined rule.

In an embodiment, if one of the two or more time windows within the first periodicity is used to transmit the RMSI, the one of the two or more time windows is not used to transmit the repeated RMSI.

In an embodiment, when the repeated RMSI is transmitted, the method further comprises receiving only RMSI physical downlink shared channel (PDSCH) comprising the RMSI.

In an embodiment, the content of the RMSI corresponding to a SS/PBCH block index, when transmitted in a RMSI transmission time interval (TTI), is not changed.

Figure 10:
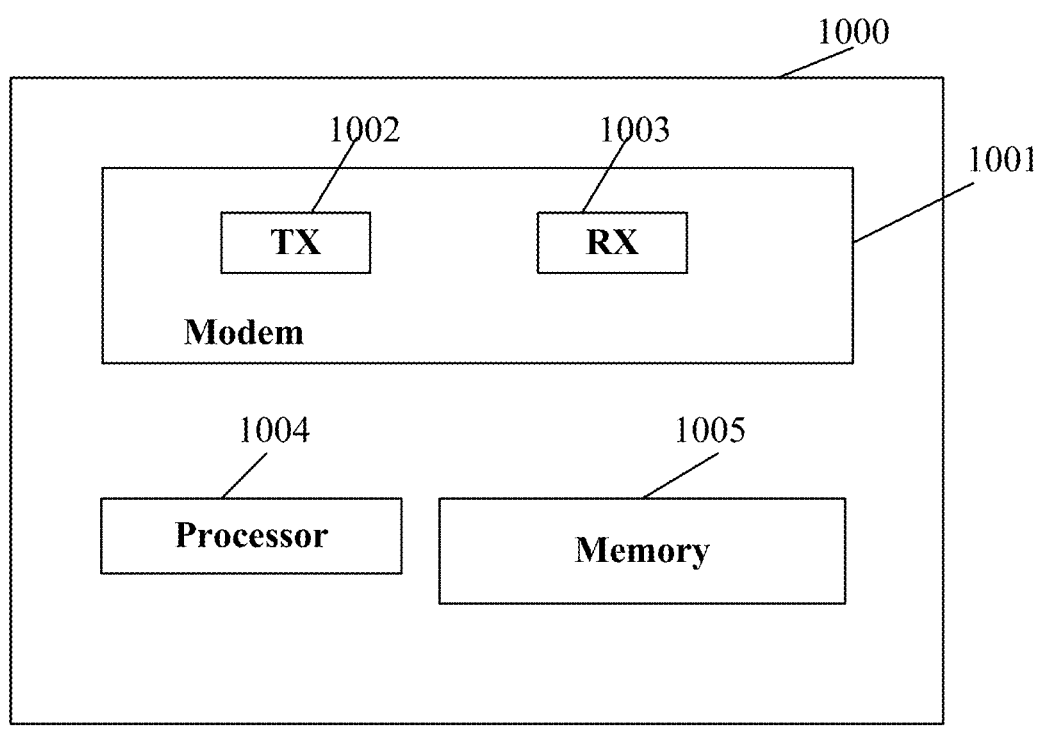
FIG. 10 is a block diagram illustrating a network device according to an embodiment of the disclosure.

FIG. 10 depicts a network device capable of implementing the methods for transmitting remaining minimum system information (RMSI) in a wireless network as described above, wherein a physical broadcast channel (PBCH) provides a subset of minimum system information for random access and configurations for fetching the other subset of the minimum system information in the RMSI, a number of synchronization signal (SS)/PBCH blocks constitute a SS burst set which is transmitted periodically with a first periodicity. As shown in FIG. 8, the network device 1000 comprises a processing device 1004, a memory 1005, and a radio modem subsystem 1001 in operative communication with the processor 1004. The radio modem subsystem 1001 comprises at least one transmitter 1002 and at least one receiver 1003. While only one processor is illustrated in FIG. 10, the processing device 1004 may comprises a plurality of processors or multi-core processor(s). Additionally, the processing device 1004 may also comprise cache to facilitate processing operations.

Computer-executable instructions can be loaded in the memory 1005 and, when executed by the processing device 1004, cause the network device 1000 to implement the above-described methods for transmitting RMSI. In particular, the computer-executable instructions can cause the network device 1000 to determine whether a SS/PBCH block in the SS burst set configures the RMSI; in response to that the SS/PBCH block configures the RMSI and the first periodicity is greater than a predefined value, transmit one or more repeated RMSI within the first periodicity.

In an embodiment, the computer-executable instructions can further cause the network device 1000 to transmit the configured RMSI based on at least one of a second redundancy version pattern, a second beam pattern, and a scheduling window that does not overlap with that of the SS burst set, wherein the at least one of the second redundancy version pattern, the second beam pattern, and the scheduling window is indicated to a terminal device in the RMSI or in a higher layer message or predefined.

In an embodiment, the computer-executable instructions can further cause the network device 1000 to transmit one or more repeated RMSI within the first periodicity based on at least one of a second periodicity, a first redundancy version pattern, a first beam pattern and a bitmap of one or more time windows within the first periodicity.

In an embodiment, a bit in the bitmap indicates whether one of the one or more repeated RMSIs is transmitted in a corresponding time window.

In an embodiment, the at least one of the second periodicity, the first redundancy version pattern, the first beam pattern, the bitmap is indicated to a terminal device in the RMSI or in a higher layer message or predefined.

In an embodiment, a slot-based or non-slot-based scheduling is indicated to a terminal device in the RMSI or in a higher layer message or predefined.

In an embodiment, there is a correspondence between the first periodicity and the second periodicity.

In an embodiment, repetitive timing frequency positions of the one or more repeated RMSIs are determined by the one indicated by the SS/PBCH block in the SS burst set based on a predefined rule.

In an embodiment, if one of the two or more time windows within the first periodicity is used to transmit the RMSI, the one of the two or more time windows is not used to transmit the repeated RMSI.

In an embodiment, when the repeated RMSI is transmitted, the method further comprises transmitting only RMSI physical downlink shared channel (PDSCH) comprising the RMSI.

In an embodiment, the content of the RMSI corresponding to a SS/PBCH block index, when transmitted in a RMSI transmission time interval (TTI), is not changed.

Figure 11:
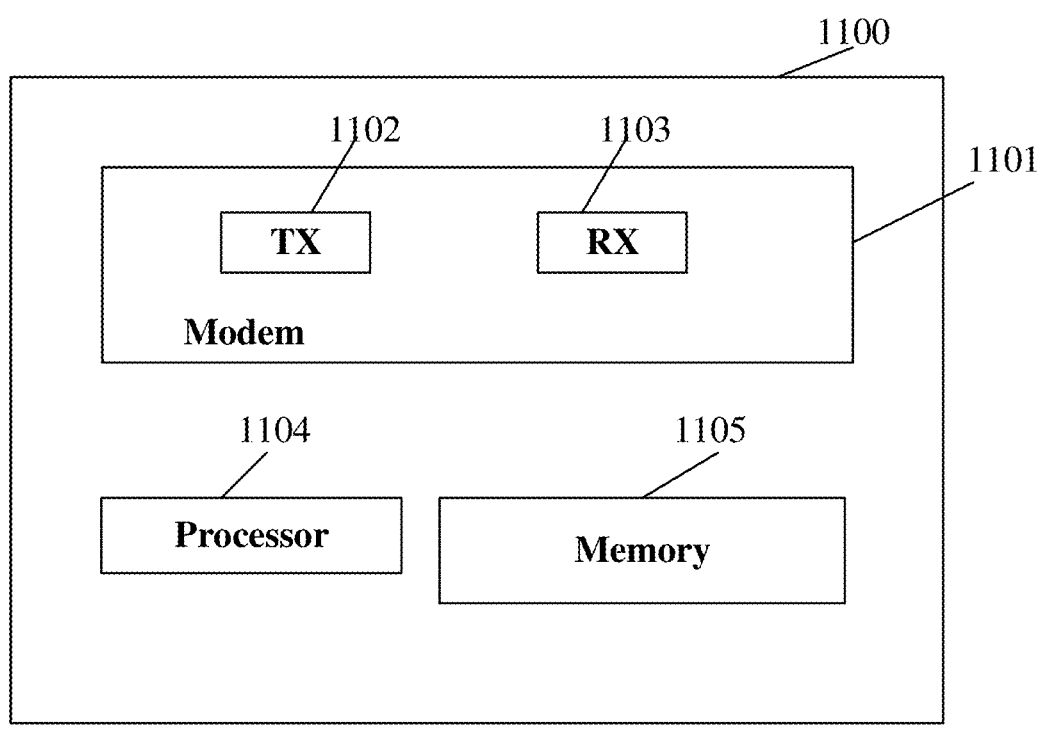
FIG. 11 is a block diagram illustrating a terminal device according to an embodiment of the disclosure.

FIG. 11 depicts a terminal device capable of implementing the methods for receiving RMSI in a wireless network, as described above, wherein a physical broadcast channel (PBCH) provides a subset of minimum system information for random access and configurations for fetching the other subset of the minimum system information in the RMSI, a number of synchronization signal (SS)/PBCH blocks constitute a SS burst set which is transmitted periodically with a first periodicity. As shown in FIG. 11, the terminal device 1100 comprises a processing device 1104, a memory 1105, and a radio modem subsystem 1101 in operative communication with the processor 1104. The radio modem subsystem 1101 comprises at least one transmitter 1102 and at least one receiver 1103. While only one processor is illustrated in FIG. 11, the processing device 1104 may comprises a plurality of processors or multi-core processor(s). Additionally, the processing device 1104 may also comprise cache to facilitate processing operations.

Computer-executable instructions can be loaded in the memory 1105 and, when executed by the processing device 1104, cause the terminal device 1100 to implement the above-described methods for receiving RMSI. In particular, the computer-executable instructions can cause the terminal device 1100 to determine whether a SS/PBCH block in the SS burst set configures the RMSI; in response to that the SS/PBCH block configures the RMSI and the first periodicity is greater than a predefined value, receive one or more repeated RMSI within the first periodicity.

In an embodiment, the computer-executable instructions can further cause the terminal device 1100 to, receive one or more repeated RMSI within the first periodicity, based on at least one of a second periodicity, a first redundancy version pattern, a first beam pattern and a bitmap of one or more time windows within the first periodicity.

In an embodiment, the computer-executable instructions can further cause the terminal device 1100 to receive the configured RMSI based on at least one of a second redundancy version pattern, a second beam pattern, and a scheduling window that does not overlap with that of the SS burst set, wherein the at least one of the second redundancy version pattern, the second beam pattern, and the scheduling window is indicated to a terminal device in the RMSI or in a higher layer message or predefined.

In an embodiment, a bit in the bitmap indicates whether one of the one or more repeated RMSIs is transmitted in a corresponding time window.

In an embodiment, the at least one of the second periodicity, the first redundancy version pattern, the first beam pattern, the bitmap is indicated to a terminal device in the RMSI or in a higher layer message or predefined.

In an embodiment, a slot-based or non-slot-based scheduling is indicated to a terminal device in the RMSI or in a higher layer message or predefined.

In an embodiment, there is a correspondence between the first periodicity and the second periodicity.

In an embodiment, repetitive timing frequency positions of the one or more repeated RMSIs are determined by the one indicated by the SS/PBCH block in the SS burst set based on a predefined rule.

In an embodiment, if one of the two or more time windows within the first periodicity is used to transmit the RMSI, the one of the two or more time windows is not used to transmit the repeated RMSI.

In an embodiment, when the repeated RMSI is transmitted, the method further comprises receiving only RMSI physical downlink shared channel (PDSCH) comprising the RMSI.

In an embodiment, the content of the RMSI corresponding to a SS/PBCH block index, when transmitted in a RMSI transmission time interval (TTI), is not changed.

FIG. 12 is a flow chart depicting a method implemented in a communication system including a host computer, a network device and a terminal device according to an embodiment of the present disclosure, which may be performed at an apparatus such as the host computer 150 of FIG. 1. As such, the terminal device may provide means for accomplishing various parts of the method 1200 as well as means for accomplishing other processes in conjunction with other components. For some parts which have been described in the above embodiments, detailed description thereof is omitted here for brevity.

As shown in FIG. 12, the method 1200 may start at block 1202 where the host computer 150 receives user data originating from a transmission from a terminal device to a network device.

FIG. 13 is a flow chart depicting a method implemented in a communication system including a host computer, a network device and a terminal device according to an embodiment of the present disclosure, which may be performed at an apparatus such as the host computer 150 of FIG. 1. As such, the terminal device may provide means for accomplishing various parts of the method 1300 as well as means for accomplishing other processes in conjunction with other components. For some parts which have been described in the above embodiments, detailed description thereof is omitted here for brevity.

As shown in FIG. 13, the method 1300 may start at block 1302 where the host computer 150 initiates a transmission carrying user data to the terminal device via the network device.

According to an aspect of the disclosure it is provided a computer program product comprising at least one non-transitory computer-readable storage medium having computer-executable program instructions stored therein, the computer-executable instructions being configured to, when being executed, cause a network device to operate as described above.

According to an aspect of the disclosure it is provided a computer program product comprising at least one non-transitory computer-readable storage medium having computer-executable program instructions stored therein, the computer-executable instructions being configured to, when being executed, cause a terminal device to operate as described above.

According to an aspect of the disclosure it is provided a computer program product comprising at least one non-transitory computer-readable storage medium having computer-executable program instructions stored therein, the computer-executable instructions being configured to, when being executed, cause a terminal device to operate as described above.

It is noted that any of the components of the network device and terminal device can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

The terms "computer program", "software" and "computer program code" are meant to include any sequences or human or machine cognizable steps which perform a function. Such program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME, Java Beans, etc.), Binary Runtime Environment (BREW), and the like.

The terms "memory" and "storage device" are meant to include, but not limited to, an electronic, magnetic, optical, electromagnetic, infrared, or semiconductor system, apparatus, or device, or any suitable combination of the foregoing. More specific examples (a non-exhaustive list) of the memory or storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method for transmitting remaining minimum system information (RMSI) in a wireless network, wherein a physical broadcast channel (PBCH) provides a subset of minimum system information for random access and configurations for fetching RMSI, wherein RMSI is a remaining subset of the minimum system information, and wherein a number of synchronization signal (SS)/PBCH blocks comprise a SS burst set which is transmitted periodically with a first periodicity, the method comprising:
   determining whether a SS/PBCH block in the SS burst set configures the RMSI;
   determining whether the first periodicity is greater than a predefined value; and
   in response to the SS/PBCH block configured the RMSI and the first periodicity is greater than the predefined value, transmitting one or more repeated RMSI within the first periodicity.

2. The method according to claim 1, wherein the transmitting the one or more repeated RMSI within the first periodicity comprises:
   transmitting the one or more repeated RMSI within the first periodicity based on one or more of:
   a second periodicity;
   a first redundancy version pattern;
   a first beam pattern; and
   a bitmap of one or more time windows within the first periodicity;
   wherein the one or more of the second periodicity, the first redundancy version pattern, the first beam pattern and the bitmap is indicated to a terminal device in the RMSI, in a higher layer message, or predefined.

3. The method according to claim 2, wherein a bit in the bitmap indicates whether one of the one or more repeated RMSI is transmitted in a corresponding time window.

4. The method according to claim 1, further comprising:
   transmitting the configured RMSI based on one or more of:
   a second redundancy version pattern;
   a second beam pattern; and
   a scheduling window that does not overlap with that of the SS burst set;
   wherein the one or more of the second redundancy version pattern, the second beam pattern, and the scheduling window is indicated to a terminal device in the RMSI, in a higher layer message, or predefined.

5. The method according to claim 1, wherein repetitive timing frequency positions of the one or more repeated RMSI are determined by one indicated by the SS/PBCH block in the SS burst set based on a predefined rule.

6. A method for receiving remaining minimum system information (RMSI) in a wireless network, wherein a physical broadcast channel (PBCH) provides a first subset of minimum system information for random access and configurations for fetching RMSI, wherein RMSI is a remaining subset of the minimum system information, and wherein a number of synchronization signal (SS)/PBCH blocks comprise a SS burst set which is transmitted periodically with a first periodicity, the method comprises:

determining that the first periodicity is greater than a predefined value;
determining whether a SS/PBCH block in the SS burst set configures the RMSI, based on a first subset of the minimum system information; and
in response to the SS/PBCH block configured the RMSI and the first periodicity is greater than the predefined value, receiving one or more repeated RMSI within the first periodicity.

7. The method according to claim 6, wherein the receiving the one or more repeated RMSI within the first periodicity comprises:
receiving one or more repeated RMSI within the first periodicity based on one or more of:
a second periodicity;
a first redundancy version pattern;
a first beam pattern; and
a bitmap of one or more time windows within the first periodicity;
wherein the one or more of the second periodicity, the first redundancy version pattern, the first beam pattern and the bitmap is indicated to a terminal device in the RMSI, in a higher layer message, or predefined.

8. The method according to claim 7, wherein a bit in the bitmap indicates whether one of the one or more repeated RMSI is transmitted in a corresponding time window.

9. The method according to claim 7, wherein there is a correspondence between the first periodicity and the second periodicity.

10. The method according to claim 6, further comprising:
receiving the configured RMSI based on one or more of:
a second redundancy version pattern;
a second beam pattern; and
a scheduling window that does not overlap with that of the SS burst set;
wherein the one or more of the second redundancy version pattern, the second beam pattern, and the scheduling window is indicated to a terminal device in the RMSI, in a higher layer message, or predefined.

11. The method according to claim 6, wherein repetitive timing frequency positions of the one or more repeated RMSI are determined by one indicated by the SS/PBCH block in the SS burst set based on a predefined rule.

12. A network device for transmitting remaining minimum system information (RMSI) in a wireless network, wherein a physical broadcast channel (PBCH) provides a subset of minimum system information for random access and configurations for fetching RMSI, wherein RMSI is a remaining subset of the minimum system information, and wherein a number of synchronization signal (SS)/PBCH blocks comprise a SS burst set which is transmitted periodically with a first periodicity, the network device comprising:
a processor; and
a memory, the memory containing instructions which, when executed by the processor, cause the network device to perform operations to:
determine whether a SS/PBCH block in the SS burst set configures the RMSI;
determine whether the first periodicity is greater than a predefined value; and
in response to the SS/PBCH block configured the RMSI and the first periodicity is greater than the predefined value, transmit one or more repeated RMSI within the first periodicity.

13. The network device according to claim 12, wherein to transmit the one or more repeated RMSI within the first periodicity comprises operations to:
transmit the one or more repeated RMSI within the first periodicity based on one or more of:
a second periodicity;
a first redundancy version pattern;
a first beam pattern; and
a bitmap of one or more time windows within the first periodicity;
wherein the one or more of the second periodicity, the first redundancy version pattern, the first beam pattern and the bitmap is indicated to a terminal device in the RMSI, in a higher layer message, or predefined.

14. The network device according to claim 13, wherein a bit in the bitmap indicates whether one of the one or more repeated RMSI is transmitted in a corresponding time window.

15. The network device according to claim 12, further comprising operations to:
transmit the configured RMSI based on one or more of:
a second redundancy version pattern;
a second beam pattern; and
a scheduling window that does not overlap with that of the SS burst set;
wherein the one or more of the second redundancy version pattern, the second beam pattern, and the scheduling window is indicated to a terminal device in the RMSI, in a higher layer message, or predefined.

16. The network device according to claim 12, wherein repetitive timing frequency positions of the one or more repeated RMSI are determined by one indicated by the SS/PBCH block in the SS burst set based on a predefined rule.

17. A terminal device for receiving remaining minimum system information (RMSI) in a wireless network, wherein a physical broadcast channel (PBCH) provides a subset of minimum system information for random access and configurations for fetching RMSI, wherein RMSI is a remaining subset of the minimum system information in the RMSI, and wherein a number of synchronization signal (SS)/PBCH blocks comprise a SS burst set which is transmitted periodically with a first periodicity, the terminal device comprising:
a processor; and
a memory, the memory containing instructions which, when executed by the processor, cause the terminal device to perform operations to:
determine that the first periodicity is greater than a predefined value;
determine whether a SS/PBCH block in the SS burst set configures the RMSI, based on a first subset of the minimum system information; and
in response to the SS/PBCH block configured the RMSI and the first periodicity is greater than the predefined value, receive one or more repeated RMSI within the first periodicity.

18. The terminal device according to claim 17, wherein to receive the one or more repeated RMSI within the first periodicity comprises operations to:
receive one or more repeated RMSI within the first periodicity based on one or more of:
a second periodicity;
a first redundancy version pattern;
a first beam pattern; and
a bitmap of one or more time windows within the first periodicity;

wherein the one or more of the second periodicity, the first redundancy version pattern, the first beam pattern and the bitmap is indicated to a terminal device in the RMSI, in a higher layer message, or predefined.

19. The terminal device according to claim 18, wherein a bit in the bitmap indicates whether one of the one or more repeated RMSI is transmitted in a corresponding time window.

20. The terminal device according to claim 18, wherein there is a correspondence between the first periodicity and the second periodicity.

21. The terminal device according to claim 17, further comprising operations to:
    receive the configured RMSI based on one or more of:
        a second redundancy version pattern;
        a second beam pattern; and
        a scheduling window that does not overlap with that of the SS burst set;
    wherein the one or more of the second redundancy version pattern, the second beam pattern, and the scheduling window is indicated to a terminal device in the RMSI, in a higher layer message, or predefined.

22. The terminal device according to claim 17, wherein repetitive timing frequency positions of the one or more repeated RMSI are determined by one indicated by the SS/PBCH block in the SS burst set based on a predefined rule.

* * * * *